G. A. JOHNSON & P. PEDERSEN.
ADVERTISING APPARATUS.
APPLICATION FILED MAR. 19, 1912.
1,132,852.
Patented Mar. 23, 1915.
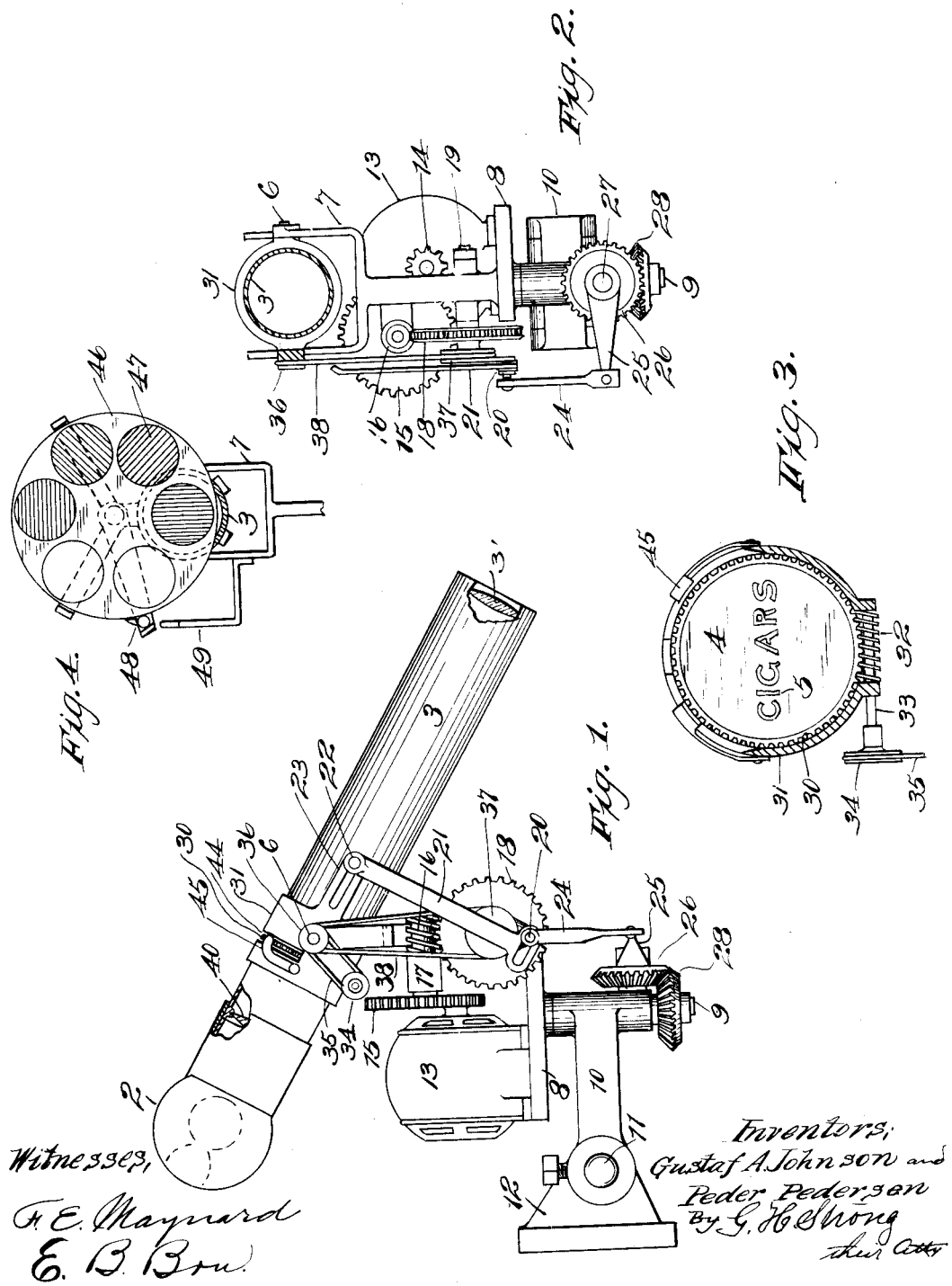

UNITED STATES PATENT OFFICE.

GUSTAF A. JOHNSON, OF ALAMEDA, AND PEDER PEDERSEN, OF SAN FRANCISCO, CALIFORNIA.

ADVERTISING APPARATUS.

1,132,852.  Specification of Letters Patent.  Patented Mar. 23, 1915.

Application filed March 19, 1912. Serial No. 684,704.

*To all whom it may concern:*

Be it known that we, GUSTAF A. JOHNSON of Alameda, county of Alameda, State of California, and PEDER PEDERSEN, of the city and county of San Francisco, California, both citizens of the United States, have invented new and useful Improvements in Advertising Apparatus, of which the following is a specification.

This invention relates to advertising apparatus and particularly to a light ray projector.

The object of the present invention is to provide an advertising apparatus involving a projector of suitable proportions and shape in combination with means whereby the projector may be given a desired movement adapted to increase the effectiveness and attractiveness of the projected sign transmitted through the projector.

It is also an object of the invention to provide an advertising apparatus including means for projecting rays of light and adapted to cast the rays in a peculiar manner so that the rays will form symbolic signs or words upon a surface, as a pavement, wall or other area; means being provided whereby the focus of the projector is automatically maintained during the movement of the projector cylinder.

The invention consists of the parts and the construction and combination of parts as hereinafter more fully described and claimed, having reference to the accompanying drawings, in which—

Figure 1 is a side elevation of the apparatus slightly broken away. Fig. 2 is a front view of the apparatus with the cylinder shown in section. Fig. 3 is a transverse section through the cylinder showing the diaphragm. Fig. 4 shows a means of varying the color of the projected light.

It is well known that rays of light may be transmitted from a suitable source of light, as a lamp, indicated at 2, Fig. 1, through a tube, illustrated as a cylinder 3; the rays of light being stopped by a surface toward which the cylinder 3 may be directed. In the present instance the cylinder or projector 3 is provided with a transverse diaphragm 4 of sufficient diameter to effectually stop the passage of light through the projector cylinder 3 which is provided as is usual in such projectors with an object lens 3' at its outer end, and a condensing lens 40 adjacent the lamp.

By cutting apertures or perforations in the diaphragm 4 of any desired configuration, when the light 2 is energized, its rays will be transmitted only through the apertures formed in the diaphragm 4, which apertures are shown in the form of letters 5. The rays of light will be projected through the cylinder out of its open end until stopped by some surface more or less remote from the projector. This form of projector is a particularly efficient form of advertising apparatus, especially at night time, when the projector 3 may be mounted in a window or in some other location. The rays escaping through the apertures 5 in the diaphragm 4, when projected upon an area which the public may readily observe, will attract considerable attention.

The efficiency of the device as an advertising medium is greatly enhanced by imparting to the projector or cylinder 3 one or a variety of movements which will cause the rays of light projected to move from position to position over the area upon which they may rest.

It is an important object of the present invention to provide a mechanism in combination with the projector, which is designed to actuate the projector or cylinder 3 to thus increase the efficiency of the apparatus as an advertising medium.

In the present instance the cylinder 3 is pivoted at 6 upon a suitable bracket 7, having a base 8 from which projects a shaft 9. The shaft 9 is here shown as extending through an arm 10, which in angularly adjustable about a trunnion 11 of a bracket or holder 12. Mounted upon the base 8 of the bracket 7 is a suitable form of motor 13, the pinion 14 of which drives a gear 15 secured to a worm shaft 16 which is revoluble in a suitable bearing 17 of the bracket 7. The worm shaft 16 is adapted to drive a worm wheel 18 secured upon a shaft 19 journaled in the bracket 7.

When motion is imparted to the worm wheel 18, this in turn drives a crank or other suitable device 20 mounted at one side of the worm wheel 18; the crank being connected by a link 21 to a pivot 22 which is adjustable in an arm 23 secured on the projector 3.

In operation the rotation of the crank 20 will be transmitted through the link 21 into an oscillating motion of the pivot 22, so that the projector or cylinder 3 is rocked on its pivots 6; thus, when the light 2 of the projector is casting rays through the cylinder 3 and the latter is oscillated about its pivots 6, the projected rays of light will sweep across such obstructing surface as may be in the path of the light rays.

In addition to the oscillating movement of the cylinder 3 upon its pivots 6, the cylinder may be swung in a horizontal plane, by means of a suitable link connection, as 24, extending from the crank 20 to a lever arm 25, which is secured to a gear 26 journaled on an axle 27 secured to the bracket 10. The gear 26 meshes with a complementary gear 28 which is secured on the downwardly extending shaft 9 of the base 8, so that during the operation of the crank 20 by the rotation of the worm wheel 18, the lever arm 25 will be oscillated by reason of the connecting link 24 and the oscillations of the beveled gear 26 will be transmitted to the gear 28, which in turn will cause the motor table 8 to swing in a desired arc, thus causing the projector or cylinder 3 to sweep in a horizontal arc simultaneously with its vertical oscillations as to the pivots 6.

One of the important features of the present invention is to so mount the light stopping diaphragm 4 in the cylinder 3 that it can be readily removed and another inserted, and also to provide means whereby the diaphragm may be moved relative to the cylinder. To accomplish this movement of the diaphragm 4, through which certain rays of light are permitted to pass by the apertures 5, there is formed upon, or secured to, the perimeter of the diaphragm 4 an annular gear 30, fitting internally in a socket 31 mounted upon the cylinder 3. Meshing with the annular gear 30 of the diaphragm 4 is a worm 32 formed on a shaft 33 which is journaled on the socket member 31 and has secured at one end a wheel 34 which is rotated by means of a chain or belt 35, Figs. 1 and 3.

The belt 35 running over the wheel 34 extends to and is driven by a double grooved pulley wheel 36 which runs loosely upon the trunnion 6, upon which the cylinder 3 may oscillate. Running over the pulley 36 and down to a pulley 37 secured on the worm wheel shaft 19 is a flexible chain or belt 38 whereby power is transmitted from the shaft 19 to the pulley wheel 36, and thence by the belt 35 to the pulley wheel 34 which drives the worm 32, this in turn revolving the diaphragm 4 in the cylinder 3. Hence, it will be seen that the combination of movements which may be imparted to the diaphragm 4, first through its worm wheel 32, or through the oscillations of the cylinder 3 on its pivots 6, or through the oscillations of the bracket 7 and table 8 relative to the support 10, will cause a variety of movements or a complex movement to the projected light rays escaping through the apertures 5 or transparencies of the diaphragm 4, so that the projected rays will sweep in a peculiar path over the surface upon which the rays rest.

By forming in the upper part of the socket or barrel 31 a slot or aperture 44 of sufficient length to permit the ready insertion and removal of the diaphragm 4, the operator may readily change diaphragms at such intervals as may be desired by the removal or insertion of the diaphragms through the aperture 44.

In order to restrain the diaphragm in its position in the barrel 31, suitably adjustable springs 45 may be provided which are adapted to reach over the aperture 44 and hold the diaphragm 4 in position, so that it will be effectively operated during the rotation of the actuating worm 32.

Manifestly, various modifications of the mechanism illustrated may be employed which will impart to the projector or cylinder 3 such a movement as may be desired, and it is understood that it is one of the important objects of the present invention to so mount the projector 3 that its efficiency as an advertising medium may be enhanced, by causing it to be moved so that the projected rays of light will sweep in a path across such a surface as may intercept the same. It is obvious that divers forms of mechanisms may be substituted, giving to the projector 3 the desired movement.

Manifestly the diaphragm 4 may be so constructed or formed that a portion will be opaque and a portion transparent, thus producing the transmission or stopping of light to project the desired sign.

As shown in Fig. 4 there may be provided a disk 46, opaque or transparent and with colored portions 47, movable across the cylinder 3 at a transverse slot 50. The disk 46 is supported or guided by arms 51 on the cylinder 3, and a clutch 48 on a pivoted arm 48' intermittently engages the perimeter of the disk, the arm resting against a stop 49 fixed to the bracket 7. In operation, when the cylinder 3 swings downward, the stationary clutch 48 will engage the edge of the disk and the downward movement of the bearing pivot on cylinder 3 of the arm 48 as to the stop 49 will cause the disk to turn a desired degree. When the cylinder 3 rises the clutch will play idly over the edge of the disk 46.

The operation of the device is as follows: When the motor is energized it drives the shaft 19, and this in turn operates the belt 38 which revolves the worm 32, and the dial or diaphragm 4; meanwhile, crank 20 and link 21 oscillate the tube 3 to sweep rays from the light 2, and also gears 26—28 are oscillated to turn the table 8.

Having thus described our invention, what we claim and desire to secure by Letters Patent is—

1. In a light-ray projecting apparatus, the combination of a tube with a condensing lens, and a source of light in suitable position relative thereto, and mounted for swinging movement, said tube having within it a diaphragm provided with advertising matter, and means to rotate the diaphragm.

2. In a light-ray projecting apparatus, the combination with a tube with a condensing lens and a source of light in suitable position relative thereto, and mounted for swinging movement, said tube having within it a diaphragm provided with advertising matter, and means to automatically rotate the diaphragm.

3. An apparatus of the character described, comprising a tube carrying a source of light and a condensing lens, means for imparting a swinging movement to the tube, a transverse diaphragm within the tube removed a substantial distance from the light, and adapted to permit the escape of a volume of light, and means for angularly moving the diaphragm relative to the tube.

4. An apparatus of the character described, comprising a tube carrying a source of light and a condensing lens, means for imparting a swinging movement to the tube, a transverse diaphragm within the tube removed a substantial distance from the light and adapted to permit the escape of a volume of light, and means for angularly moving the diaphragm relative to the tube while the tube is swinging.

5. An advertising apparatus, comprising a light projecting tube with suitable lens and source of light, a turn-table upon which the tube is mounted, a motor on the table and connections between the motor and table, whereby the latter is rotated in a horizontal plane.

6. An advertising apparatus, comprising a light projecting tube with suitable lens and source of light, a turn-table upon which the tube is tiltably mounted, a motor on the table, and connections between the motor and table whereby the latter is rotated in a horizontal plane.

7. An advertising apparatus, comprising a light-projecting tube, with suitable lens and source of light, a turn-table upon which the tube is tiltably mounted, a motor on the table and connections between the motor and table whereby the latter is rotated in a horizontal plane, and means for tilting said tube.

8. A light projector, comprising a tube with a source of light and suitable lens, a light intercepting turnable diaphragm interposed between the light and the objective or outer end of the tube, a support upon which the tube is movably mounted, and a motor and connections for moving the tube and the diaphragm.

9. A light projector, comprising a tube with a source of light and suitable lens, a light intercepting turnable diaphragm interposed between the light and the objective or outer end of the tube, a support upon which the tube is mounted, and a motor and connections for simultaneously moving the tube and the diaphragm.

10. A light projector, comprising a tube with a source of light and suitable lens, a light intercepting turnable diaphragm interposed between the light and the objective or outer end of the tube, a support upon which the tube is mounted, and a motor and connections for simultaneously moving the tube and the diaphragm, and actuating the support.

11. An advertising apparatus, comprising a light projecting tube, a source of light and a suitable lens therein, a diaphragm movably mounted in the tube, and through which unobstructed rays of light may pass, means for moving the diaphragm relative to the tube, a support upon which the tube is movably mounted, and mechanism for tilting the tube to sweep the illuminating rays across a surface upon which they may project, and a motor for operating said means and mechanism.

12. An advertising apparatus, comprising a light projecting tube, a source of light and a suitable lens therein, a diaphragm movably mounted in the tube, and through which unobstructed rays of light may pass, means for moving the diaphragm relative to the tube, a support upon which the tube is movably mounted, and mechanism for tilting the tube to sweep the illuminating rays of light across a surface upon which they may project, and a motor for operating said means and mechanism, and a turn-table carrying said support, and operable by the motor.

In testimony whereof we have hereunto set our hands in the presence of two subscribing witnesses.

GUSTAF A. JOHNSON.
PEDER PEDERSEN.

Witnesses:
F. E. MAYNARD,
ROBERT R. RUSS.